June 4, 1963
N. P. BORETTI
3,092,713
HAND WELDING GUN
Filed April 13, 1960
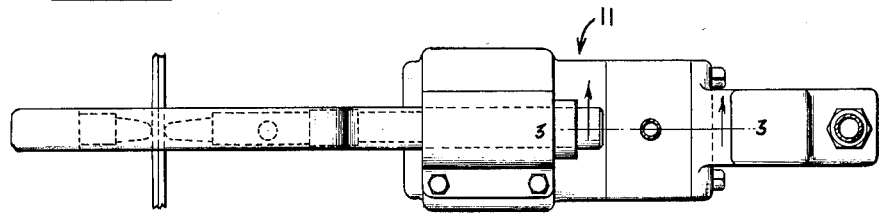
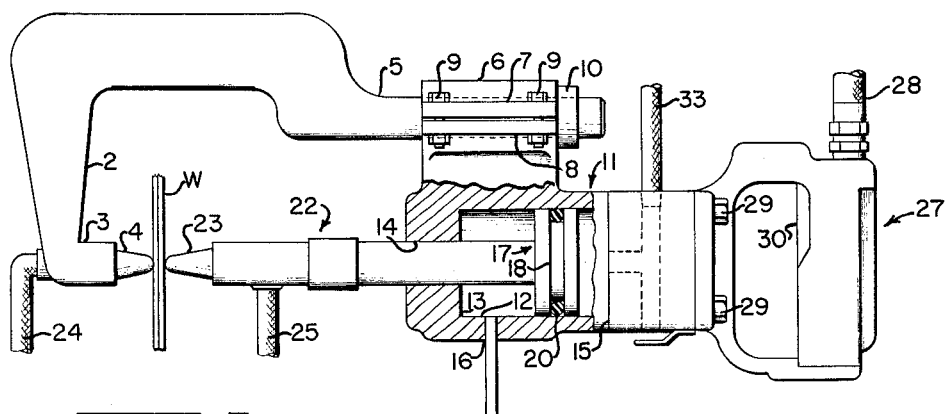
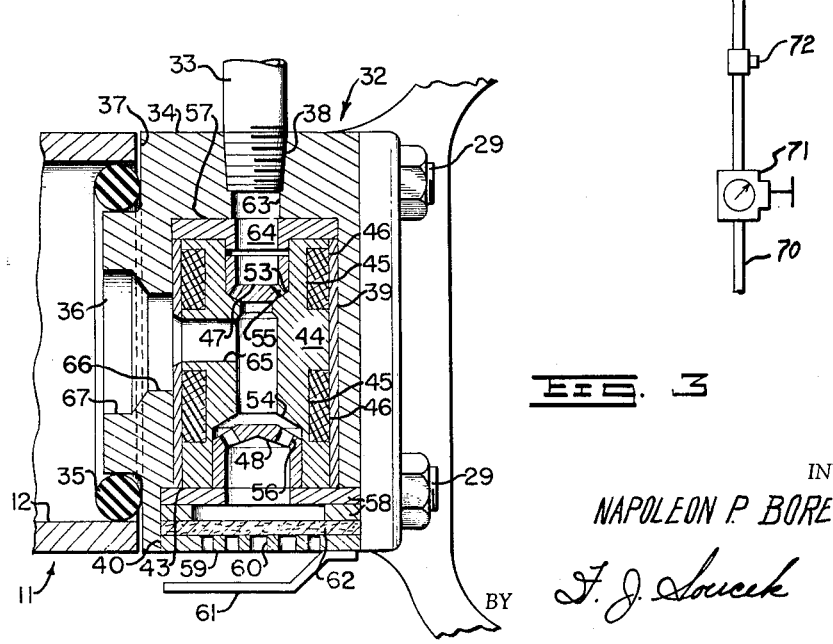
INVENTOR
NAPOLEON P. BORETTI
BY F. J. Soucek
ATTORNEY United States Patent Office 3,092,713
Patented June 4, 1963

3,092,713
HAND WELDING GUN
Napoleon P. Boretti, Detroit, Mich., assignor to General Motors Corporation, Detroit, Mich., a corporation of Delaware
Filed Apr. 13, 1960, Ser. No. 21,996
6 Claims. (Cl. 219—89)

This invention relates to welding apparatus and more particularly to portable, hand, welding tools for electric resistance welding.

The invention contemplates the provision of welding apparatus having relatively movable electrodes engageable with parts to be welded and having a valve means to move the electrodes into operative position and a source of fluid power to return the electrode to its original position. The most common type of welding guns in use today use statically mounted controls with hoses leading to the portable guns. Therefore, a hose is required to extend from the statically mounted valve to the gun, causing a loss of air and a slight time delay both of which are caused by the volume of air needed to fill and exhaust the lengthy hose.

It is the object of this invention to use a miniature solenoid valve in the welding gun body to eliminate a statically mounted valve, to reduce the overall welding time cycle and volume of air needed for operation, to provide a constant low pressure air return for the electrode piston rather than the conventional spring or intermittent air return, to reduce the volume of air needed to return the piston and to considerably reduce if not eliminate entirely air leakage caused by seepage past the shaft seal and the piston seal and to allow for compact design, low maintenance cost and lower initial tool cost.

Still other objects and attendant advantages of the invention will become apparent to persons familiar with the art to which this invention relates from the following description taken in connection with the accompanying drawings in which there is illustrated a preferred embodiment of the invention and in which:

FIGURE 1 is a top view of the structure embodying the present invention;

FIGURE 2 is a side elevation with a partial sectional view of the piston in energized position of the present invention; and FIGURE 3 is a sectional view of the solenoid valve taken on line 3—3 of FIGURE 1.

Like reference characters refer to like parts on different figures of the drawing.

Referring to the drawing, illustrated in FIGURE 2 is a generally L-shaped frame or yoke 1 having an offset portion 2 terminating in a post 3. A stationary electrode 4 is retained within post 3 and is provided with a suitable retaining means. The yoke 1 has an offset portion 5 extending from its body portion into a split clamp 6. Clamping flanges 7 and 8 extend from the split clamp 6 and retain the offset portion 5 by suitable bolts and nuts 9.

To allow for adjustment of the yoke 1 a collar 10 is provided which is movably secured to the extremity of the portion 5. This adjustment feature allows varied sizes of parts to be welded by reason of the changeability of the position of yoke 1 in relation to the cylinder block 11. To adjust the yoke 1, the portion 5 is moved to the desired position within the split clamp 6 and the bolts 9 are tightened. The collar 10 is also moved to abut the end of the split clamp 6 and locked in position by any suitable means. Since the force applied to the stationary electrode has a tendency to move the portion 5 of the yoke 1 out of the split clamp 6, the locking collar 10 is provided to abut the clamp and prevent such movement.

A cylinder block, generally indicated by the reference 11, is provided with a cylinder bore 12. One end wall 13 of the block has a bore 14 therethrough which bore is coaxial with the cylinder bore 12. The opposite end 15 of the block is closed by a solenoid valving mechanism 32 more fully described hereinafter. A fluid inlet passage 16 is provided for the cylinder 12 at a position adjacent the cylinder wall 13.

A piston 17 operates within the cylinder bore 12 and has a groove 18 formed therein to receive a piston ring 20. The piston 17 has extending from one end thereof, a piston rod that protrudes through the bore 14 and terminates in the piston rod end 22. A movable electrode 23 is retained within the piston rod end 22 and is on the same centerline as the axis of the post 3 and the stationary electrode 4. The movable electrode 23 is retained within the piston rod end 22 by any suitable means which allows for its removal for repair or replacement purposes.

Welding cables 24 and 25 are connected to the electrodes 4 and 23, respectively, to provide means for welding current to be introduced to the electrodes.

An electrical conduit 28 extends from one end of a triggering system, generally indicated by the numeral 27, and this system is attached to the cylinder block 11 by the bolts 29. The trigger 30 sends a signal to a control box (not shown) which in turn sets the welding cycle and transmits the necessary welding current to the electrodes 4 and 23 through the cables 24 and 25. The trigger 30 also actuates the solenoid valve 32 which is interposed between the cylinder block 11 and the triggering system 27. The bolts 29 secure both the valve 32 and the triggering system 27 to the cylinder block 11.

The piston 17 with its associated electrode 23 is caused to be reciprocated by air or other fluid pressure acting on opposite sides of the piston. In accordance with the present invention a relatively low and constant pressure is applied to one side of the piston tending to move the piston to the right (FIGURE 2) and maintain the electrode 23 out of engagement with the workpiece W. When it is desired to move the electrode 23 to the left to begin a welding operation, a relatively high pressure is applied to the left side of the piston through the solenoid valve 32.

Referring now to FIGURE 3 the solenoid valve is coupled through a conduit 33 to a source of high pressure which may, for example, have a value of 100 lbs. per square inch (p.s.i.). The valve housing 34 is joined to the opened end of cylinder 12 and an O-ring 35 is interposed between the walls of the cylinder and an extension 36 on the housing 34. The O-ring 35 has a thickness that is greater dimensionally than the axial length of the extension 36. Accordingly, the O-ring not only engages side 37 of the housing to provide a fluid seal, but further constitutes a shock absorbing ring that limits movement of the piston whereby unnecessary damage to the valve 32 is prevented. The housing 34 is provided with an inlet 38 leading into the center of the valve casing 39. An outlet 40 is provided in an opposite wall of the housing 34. A sleeve 43 forming part of the valve encloses an inner valve body 44 having recesses 45 at opposite ends thereof which receive windings 46 that are electrically connected to the triggering system 27 referred to above. The valve 32 is further provided with an inlet poppet valve 47 and an outlet poppet valve 48 that comprise movable armatures for the windings 46. The inlet valve 47 is normally seated on valve seat 53 formed in the inner body member 44 and the outlet valve 48 is adapted to contact seat 54 of body 44. The inlet and outlet valves 47 and 48 are provided with passages or openings 55 and 56, respectively. An end plate 57 completes a magnetic circuit at the top of sleeve 43 and end plates 58 complete a magnetic circuit adjacent the outlet end of the valve. An outlet plate 59 provided with apertures 60 secures a filter element 62 adjacent the outlet of the valve to diffuse the air or fluid being exhausted through the valve. A deflector plate 61 is secured to plate 59 to deflect and diminish the pressure of the fluid exhausted from the valve. The lower end plate 58 is cut back to exhaust the air through a greater portion of the filter element 62 and this arrangement allows for more apertures 60 to prevent back pressure. An inlet opening 63 communicates with an opening 64 which in turn communicates with a passage 65 and openings 66 and 67 leading to one side of the cylinder 12 and piston 17.

In order to supply a relatively low and constant pressure to the left side of the piston 17 (FIGURE 2) a conduit 70 leading from a suitable source of pressure, not shown, is connected to the inlet 16 of cylinder 12 through a pressure regulating valve 71 and a pressure relief valve 72. Assuming the pressure in line 70 to be 100 p.s.i. the regulating valve 71 may reduce the pressure to a value of 15 p.s.i. which pressure is applied to the left of piston 17. Relief valve 72 may be set to open at a pressure of approximately 17 p.s.i.

*Operation*

For the operation of the subject welding gun, the position of the yoke 1 may be determined by the thickness of the parts W and the offset portion 5 is moved to the desired position within the split clamp 6. In this desired position, the bolts 9 are tightened on the clamping flanges 7 and 8 and the collar 10 is also tightened to act as a stop.

With the parts W in position, the trigger 30 is depressed to simultaneously actuate the coils 46 to cause the poppet valves 47 and 48 to move to their upper position so that the outlet valve 48 mates with the seat 54 thereby closing the outlet passage and the inlet valve 47 moves away from seat 53 to open the inlet passage 64. With the poppet valves in this position the pneumatic fluid passes through the valve 32 and is directed into the cylinder bore 12 and acts upon the piston 17 moving the piston and electrode 23 to the left (FIGURE 2). At the same time that the coils 46 are actuated, the trigger 30 controls the application of welding current to the conduits 24 and 25 and electrodes 4 and 23.

After the welding operation is completed, the trigger 30 is released to de-energize the coils 46 and allow the poppet valves 47 and 48 to return to the position indicated in FIGURE 3. This, in essence, shuts off the pneumatic fluid entering through conduit 33 and allows the pressure within the cylinder 12 to exhaust through the plate 59 and into the atmosphere. Since there is a constant pressure of approximately 15 p.s.i. acting on the left side of the piston, the piston is now moved to the right to remove the electrode 23 from the workpiece W. When moving to the right the piston engages that portion of the shock absorbing ring 35 that protrudes beyond the extension 36, and is prevented by the ring from directly striking the valve housing and ultimately damaging the valve.

It is thus seen that a compact and efficient hand welding gun has been provided which combines the small solenoid valve 32 within the hand welding gun to actuate the piston 17 and further provides a constant low pressure for returning the piston to its initial position.

What is claimed is:

1. In welding apparatus having at least one movable electrode, piston means for moving said electrode, a cylinder in which said piston is reciprocably movable, a first inlet passage adjacent one end of said cylinder, a first conduit means connecting said first inlet passage to a source of high pressure fluid, pressure reducing valve means in said first conduit for reducing said high pressure fluid to a constant relatively low pressure, a second inlet passage adjacent the other end of said cylinder, second conduit means connected between said second inlet passage and said source of high pressure fluid, a solenoid valve mounted adjacent said cylinder and interposed between said second conduit means and said second inlet, and means to actuate said solenoid valve whereby high pressure fluid enters said cylinder to move said piston toward said one end of said cylinder.

2. A welding apparatus as defined by claim 1 wherein a pressure relief valve is interposed between said first inlet passage and said pressure reducing valve means.

3. In a hand welding gun having at least one movable electrode and piston means for moving said electrode, the combination comprising a cylinder formed in said gun in which said piston reciprocates, solenoid valve means mounted on said gun adjacent said cylinder, an inlet passage for said solenoid valve, means connecting said inlet passage to a source of high pressure fluid, first and second outlet passages for said valve, means directly connecting one of said outlet passages with said cylinder, an inlet poppet valve positioned in said inlet passage, an outlet poppet valve positioned in the other of said outlet passages, first and second electric windings mounted adjacent said inlet and outlet poppet valves, said inlet poppet valve being normally subjected to the high pressure fluid from said source and being normally maintained in a closed position thereby, and means for energizing said electric windings to simultaneously move said inlet poppet valve to an open position and move said outlet poppet valve to a closed position.

4. A hand welding gun as defined by claim 3 wherein a deflector is mounted on said gun adjacent said other of said outlet passages to diffuse fluid exhausted therethrough.

5. In a welding device having at least one movable electrode and piston means for moving said electrode, the improvement comprising means applying a relatively low pressure to one side of said piston, means applying a relatively high pressure to the other side of said piston, said last means including a valve mounted adjacent said piston, and shock absorbing means positioned between said piston and said valve.

6. In a welding apparatus having at least one movable electrode, piston means for moving said electrode, and a cylinder in which said piston is reciprocally movable, a first cylinder inlet passage adjacent one end of said cylinder, a first conduit means connecting said first cylinder inlet passage to a source of constant relatively low pressure fluid, a second cylinder inlet passage adjacent the other end of said cylinder, a solenoid valve means mounted on said apparatus adjacent the second cylinder inlet passage, a valve inlet passage, means connecting said valve inlet passage to a source of high pressure fluid, first and second valve outlet passages, one of said valve outlet passages directly connecting with said second cylinder inlet passage, an inlet poppet valve positioned in said valve inlet passage, an outlet poppet valve positioned in the other of said valve outlet passages, first and second electric windings mounted adjacent said inlet and outlet poppet valves, said inlet poppet valve being normally subjected to the high pressure fluid from said high pressure source, and being normally maintained in a closed position thereby, and means for energizing said electrical windings to simultaneously move said inlet poppet valve to an open position and move said outlet poppet valve to a closed position whereby high pressure fluid enters the cylinder to move said piston to said one end of said cylinder.

References Cited in the file of this patent

UNITED STATES PATENTS

| | | |
|---|---|---|
| 1,779,365 | Von Henke | Oct. 21, 1930 |
| 2,063,258 | Martin | Dec. 8, 1936 |
| 2,286,104 | Platz | June 9, 1942 |
| 2,290,344 | Martin | July 21, 1942 |
| 2,376,692 | Heim | May 22, 1945 |
| 2,839,665 | Wolfbauer | Aug. 28, 1958 |

FOREIGN PATENTS

| | | |
|---|---|---|
| 919,963 | Germany | Nov. 8, 1954 |
| 970,168 | Germany | Aug. 28, 1958 |